Dec. 13, 1966   M. A. KEITH   3,291,283
FLEXIBLE CONVEYORS
Filed March 22, 1965   2 Sheets-Sheet 2
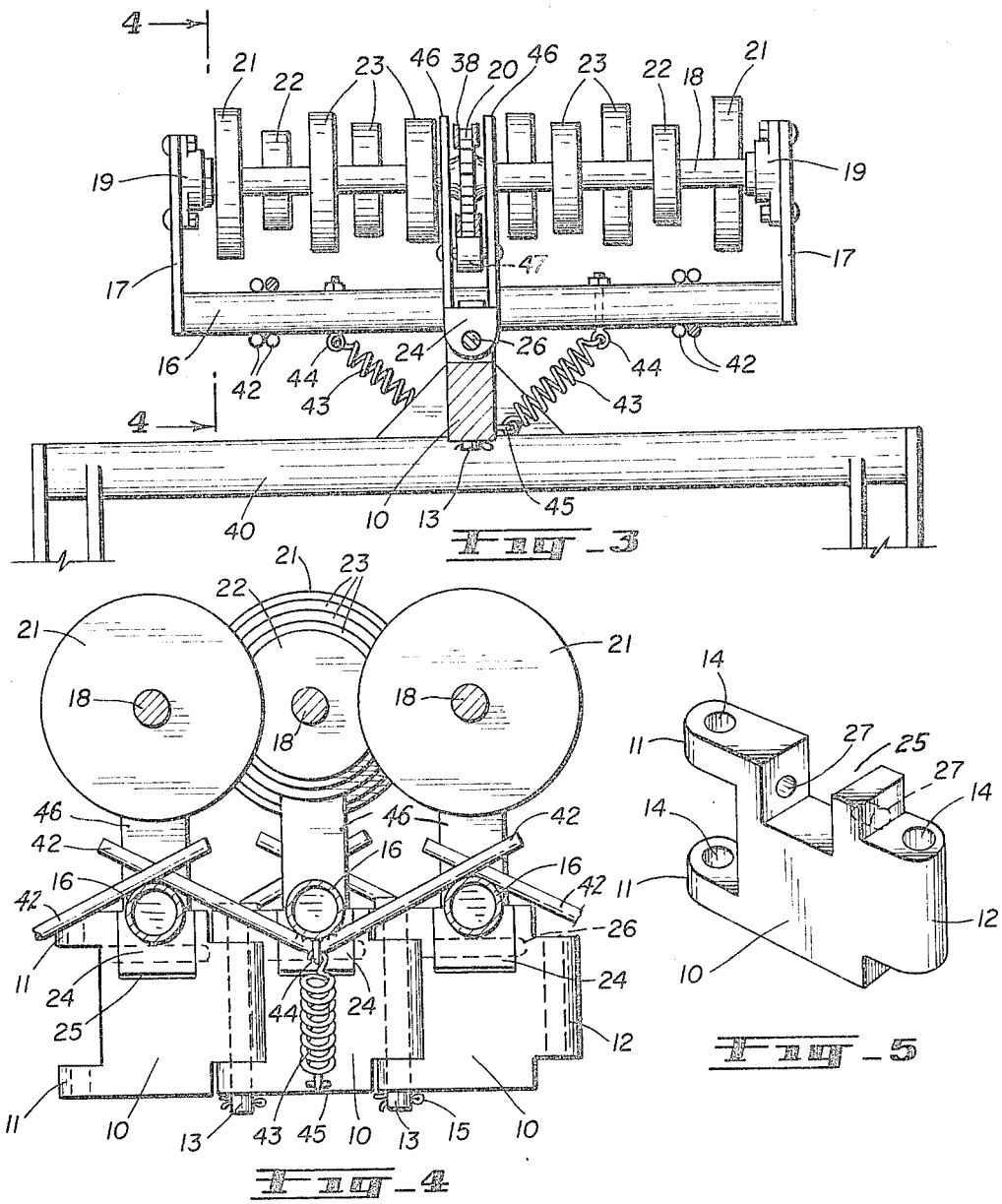
INVENTOR.
MILROY A. KEITH
BY
ATTORNEY 3,291,283
FLEXIBLE CONVEYORS
Milroy A. Keith, 1873 S. Alcott St., Denver, Colo.
Filed Mar. 22, 1965, Ser. No. 441,571
3 Claims. (Cl. 198—109)

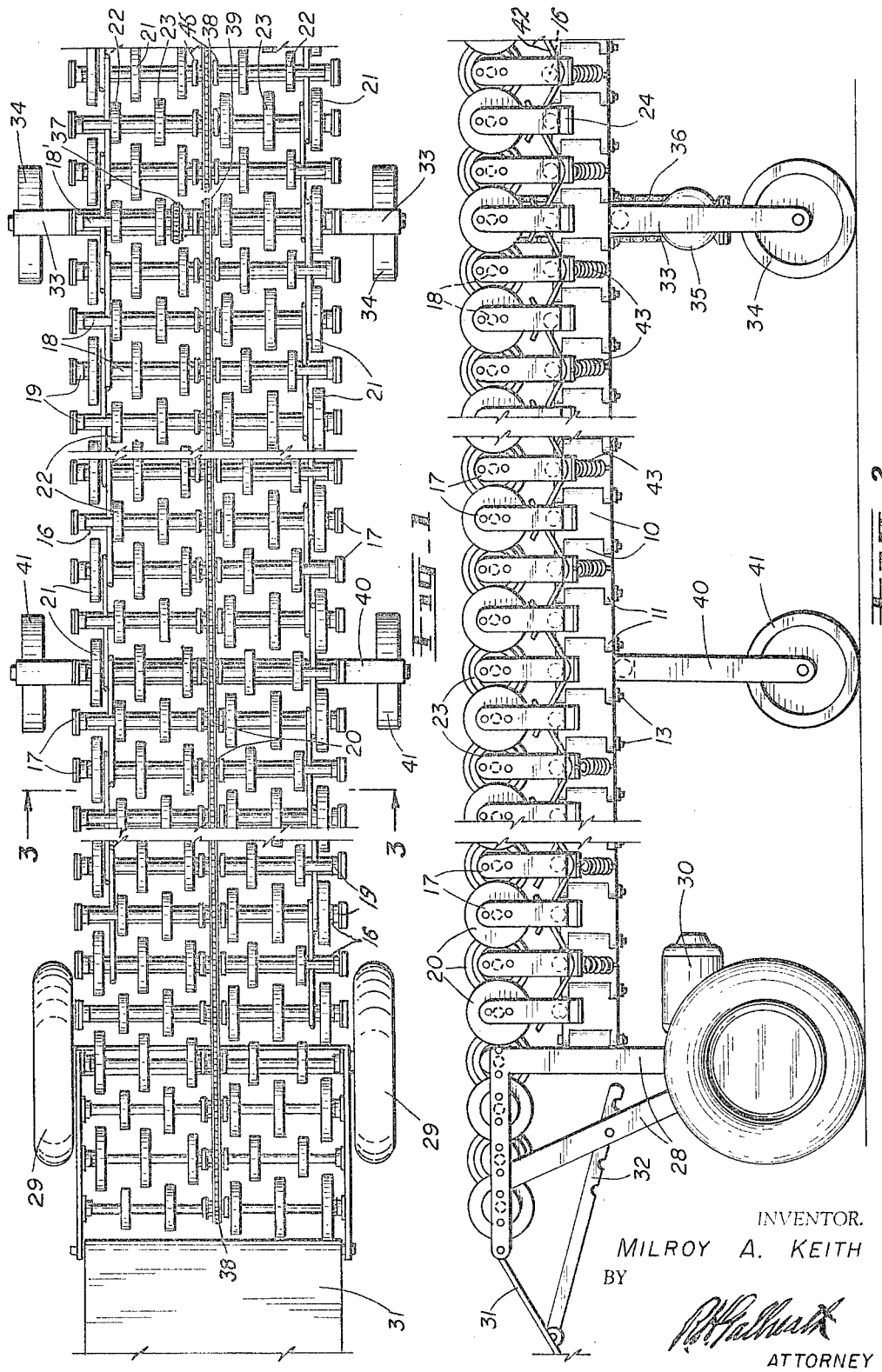

This invention relates to a motor-driven conveyor for articles such as sacks, bags, packages and similar articles for loading into trucks and railway cars, and has for its principal object the provision of a highly efficient, portable, self-propelled and motor-driven conveyor which can be horizontally bent or flexed in relatively short radius arcs to convey articles in any desired direction such as through doorways, around columns and other obstructions and which will produce elevated conveying paths along the sides of the conveyor and a depressed conveying path along the center line of the conveyor so as to tend to maintain the articles on the conveyor as they travel longitudinally.

Another object is to so construct the conveyor that when the latter is positioned to travel in an arc the article path on the inside of the arc will be automatically lowered to cause the articles being conveyed to continue to follow the axis of the conveyor around any arcuate bend or bends in which the conveyor may be positioned.

A further object is to provide a safe flexible conveyor which will be economical to construct and operate; which have an open design to prevent the accumulation of "spillage"; which will handle bagged materials, such as mailbags without damage to the contents; and which can be readily and easily moved to and positioned along any desired path.

Other objects and advantages reside in the detail construction of the invention, which is designed for simplicity, economy, and efficiency. These will become more apparent from the following description.

In the following detailed description of the invention, reference is made to the accompany drawing which forms a part hereof. Like numerals refer to like parts in all views of the drawing and throughout the description.

In the drawing:

FIG. 1 is a fragmentary plan view of typical portions of the improved conveyor;

FIG. 2 is a side elevational view of the typical portions shown in FIG. 1;

FIG. 3 is an enlarged cross-sectional view through the conveyor, taken on the line 3—3, FIG. 1;

FIG. 4 is a still further enlarged fragmentary, detail cross-section taken on the line 4—4, FIG. 3; and FIG. 5 is a detail perspective view of a frame link as employed to form the flexible frame of the improved conveyor to be later described.

One of the principal features of the flexible conveyor is a medially positioned articulated, flexible, frame member consisting of a plurality of vertically-positioned frame links 10 as shown in detail in FIG. 5. The frame links 10 are all similar in design and each terminates at one extremity in two vertically-spaced-apart hinge ears 11 and at the other extremity in a vertical hinge lug 12 which fits snugly between the hinge ears 11 of an adjacent frame link 10. The ears and lugs are hingedly attached, by means of headed hinge pins 13, which pass vertically through pin holes 14 in the link and which are locked in place, such as by means of suitable cotter keys 15, to form a continuous articulated frame member extending the entire length of the desired conveyor.

Each frame link supports a transversely extending roller assembly which extend in uniform, parallel relation throughout the length of the conveyor. The roller assemblies are similar and each comprises an elongated, preferably tubular cross member 16 terminating at its extremities in upstanding bearing plates 17 between which a roller shaft 18 is journalled in terminal bearings 19. A centrally positioned chain sprocket 20 and a plurality of metal discs or rollers are suitably keyed to each roller shaft 18. As illustrated, each shaft carries a relatively large roller 21 adjacent its one extremity and a relatively small roller 22 adjacent its other extremity, with three intermediate rollers 23 of successively decreasing diameter spaced therebetween. A pivot block 24 is welded or otherwise fixedly secured beneath the mid-point of each cross frame member 16. The pivot blocks 24 are fitted into receiving notches 25 formed in the frame links 10 and are tiltably pivoted therein upon pivot pins 26 which extend through and between pivot-pin-bearing-openings 27 formed in the sides of the receiving notches 25.

When assembled on the articulated frame member, the roller assemblies are adjacently reversed so that the large rollers 21 of each alternate assembly are in alignment with each other at one side of the conveyor and the large rollers 21 of each intermediate assembly are in alignment with each other at the other side of the conveyor. The rollers of adjacent shafts are positioned in staggered relation with each other shown in FIG. 1.

At the delivery end of the conveyor, the final frame link 10 is mounted on a delivery frame structure 28 mounted on drive wheels 29 which can be driven through any suitable, conventional differential transmission from a remote controlled electric drive motor 30. The terminal roller shafts 18 are journalled in the delivery frame structure 28 to deliver articles to a delivery chute 31 which is adjustably supported as indicated at 32. The lead end of the conveyor (not shown) is mounted on a similar frame structure similarly driven by a second drive motor. The frame structure at the lead end is a substantial repetition of the frame structure 28.

At uniform intervals throughout the length of the conveyor the articulated flexible frame member is supported upon conveyor drive frames 33, each of which is mounted on supporting wheels 34 and each of which carries a conveyor drive motor 35 from which a conveyor drive chain 36, or other power transmission device, extends to and drives a driven sprocket 37 fixed on the roller shaft which is immediately above the drive frame 32, designated on the drawing by the numeral 18'. The conveyor drive frames 33 divide the total conveyor into uniform, independently-driven sections. In each section an endless, medially positioned roller chain 38 extends forwardly, from a drive sprocket 39 on the roller shaft 18' and over and under the chain sprockets 20 of all of the roller shafts 18 so that the motor 35 of each section drives all of the rollers 21, 22 and 23 of that particular section simultaneously forward.

A chain guard plate 46 is fixed to and arises from each tubular cross member 16 at each side of each chain sprocket 20 to maintain the chain in alignment with the sprockets. An idler roller 47 is mounted between each pair of chain guard plates 46 to support the lower reach of the chain in meshing engagement with the sprockets. To assist in supporting the weight of the load, each section may be provided with an intermediate supporting frame 40 having supporting wheels 41.

The pivot blocks 24 on the tubular cross members 16 which are positioned immediately over each of the frames 33 and 40 are fixedly mounted in the notches 25 of the frame links 10 which they cross, by welding or otherwise, so that they and the roller assemblies which they support cannot tilt laterally. The intermediate roller assemblies, however, are free to tilt on their pivot pins 26.

The titling is controlled by welding, or otherwise securing, a flaring V-shaped tilt control rod 42 below each tubular cross member 16 proximate to the smallest roller 22 on the shaft above. The flaring extremities of each tilt control rod extend on an incline over the two adjacent cross members. The latter extremities are maintained in slidable contact with the adjacent cross members 16 as shown in FIG. 4, by means of tension springs 43 each of which is tensioned between a spring adjusting eye 44, on each cross member 16, positioned proximate to the smallest roller 22, and a spring hook 45 on the adjacent supporting frame link 10.

Thus, it will be seen that a continuous series of control rods 42 extend along each side of the conveyor and that each series tends to force the large roller extremities of the roller assemblies downwardly and the small roller extremities of the assemblies upwardly against the bias of the tension springs 43. The springs 43 are relatively adjusted by means of the adjusting eyes 44 so as to resiliently maintain the entire conveyor transversally level.

If the conveyor be bent or turned on a horizontal arc the extremities of the cross members 16 at the inside circumference of the arc will move toward each other to cause the control rods to slide over the adjacent cross members to elevate the small rollers 22, against the bias of the springs 43 and simultaneously depress the large rollers 21 at the inside of the arc to produce an inwardly tilted path for the articles being conveyed around the arc so as to retain them in place thereon.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. A flexible conveyor structure comprising:
    (a) a series of frame links articulated together on vertical axes to form a horizontal, flexible frame member;
    (b) a cross member medially mounted on each of said links, said cross members extending oppositely outward from said frame member in normally horizontal parallel relation;
    (c) bearing support extending upwardly from each extremity of each of said cross members and supporting a shaft bearing thereover;
    (d) a roller shaft rotatably supported between the shaft bearings of each cross member in parallel relation to the latter;
    (e) a plurality of circular disc-like rollers fixedly mounted on each roller shaft in spaced relation therealong, the plurality of rollers on each shaft successively diminishing in diameter from a large roller adjacent one extremity of the shaft to a small roller adjacent the other extremity thereof, adjacent shafts along said frame member being oppositely positioned so that the large rollers will alternate with the small rollers along each side of said conveyor;
    (f) means for simultaneously rotating all of said shafts in a common direction;
    (g) means for portably supporting said flexible frame member; and
    (h) horizontal pivot means tiltably mounting the cross members on their respective links so that the former may tilt vertically on the latter.

2. A flexible conveyor as described in claim 1 having resilient means resisting the tilting of said cross members.

3. A flexible conveyor as described in claim 2 in which the resilient means comprises a spring tensioned between each alternate cross member and its respective link and tending to tilt the small rollers of the alternate cross members downwardly and control rods extending from the alternate cross members into contact with the intermediate cross members to impart a simultaneous and opposite tilt to the intermediate cross members.

References Cited by the Examiner

UNITED STATES PATENTS

| | | | |
|---|---|---|---|
| 1,114,621 | 10/1914 | Lewis | 198—127 X |
| 1,650,037 | 11/1927 | Phillips et al. | 198—127 |
| 1,906,288 | 5/1933 | Twomley | 198—35 |
| 2,384,959 | 9/1945 | Pearson | 198—109 X |
| 2,592,275 | 4/1952 | Grosvenor | 198—127 X |

FOREIGN PATENTS

| | | |
|---|---|---|
| 550,601 | 12/1922 | France. |

EVON C. BLUNK, *Primary Examiner.*

M. L. AJEMAN, *Assistant Examiner.*